US009582484B2

(12) United States Patent
Gajera et al.

(10) Patent No.: US 9,582,484 B2
(45) Date of Patent: Feb. 28, 2017

(54) METHODS AND SYSTEMS FOR FILLING FORMS

(71) Applicant: Xerox Corporation, Norwalk, CT (US)

(72) Inventors: Rinku Gajera, Karnataka (IN); Abhishek Tripathi, Bangalore (IN); Nischal M Piratla, Fremont, CA (US)

(73) Assignee: Xerox Corporation, Norwalk, CT (US)

( * ) Notice: Subject to any disclaimer, the term of this patent is extended or adjusted under 35 U.S.C. 154(b) by 601 days.

(21) Appl. No.: 14/042,933

(22) Filed: Oct. 1, 2013

(65) Prior Publication Data
US 2015/0095753 A1 Apr. 2, 2015

(51) Int. Cl.
G06F 17/24 (2006.01)

(52) U.S. Cl.
CPC ........... G06F 17/243 (2013.01); G06F 17/248 (2013.01)

(58) Field of Classification Search
CPC ............................ G06F 17/243; G06F 17/248
USPC .................................................. 715/224, 226
See application file for complete search history.

(56) References Cited

U.S. PATENT DOCUMENTS

| 7,930,226 B1* | 4/2011 | Quinn | G06Q 10/10 705/31 |
| 2007/0124507 A1* | 5/2007 | Gurram | G06F 3/0481 710/1 |
| 2007/0168382 A1* | 7/2007 | Tillberg | G06F 17/30253 |
| 2008/0314968 A1* | 12/2008 | Maher | G06Q 10/10 235/375 |
| 2012/0051649 A1* | 3/2012 | Saund | G06K 9/2054 382/195 |
| 2013/0124414 A1* | 5/2013 | Roach | G06Q 20/10 705/44 |
| 2013/0198072 A1 | 8/2013 | Pettit et al. | |
| 2014/0122989 A1* | 5/2014 | Eigner | H04L 67/30 715/226 |
| 2014/0229204 A1* | 8/2014 | Huynh | G06Q 30/0611 705/4 |

* cited by examiner

Primary Examiner — Scott Baderman
Assistant Examiner — Seung Jung
(74) Attorney, Agent, or Firm — Philip E. Blair; Fleit Gibbons Gutman Bongini & Bianco P.L.

(57) ABSTRACT

A system for facilitating filling at least one unfilled form including at least one data field is disclosed. The system includes a display module configured to display the at least one unfilled form. Further, the system includes a scanning module configured to scan at least one supporting document, a classifier module configured to classify the at least one supporting document into at least one document class, an extracting module configured to extract the information from the at least one supporting document based on the at least one document class, a questionnaire module configured to provide an adaptive questionnaire to obtain additional information, and a form-filling module configured to fill out the at least one unfilled form to obtain at least one filled form. Finally, the system includes a communication module configured to send the at least one filled form over a communication network.

10 Claims, 8 Drawing Sheets

FIG. 7

METHODS AND SYSTEMS FOR FILLING FORMS

TECHNICAL FIELD

The presently disclosed embodiments relate to application forms for various business services, and more particularly, to methods and systems for form filling, processing and/or validation.

BACKGROUND

Customer acquisition is a key requirement for growth for service businesses in various industries such as banking, insurance, telecommunication, cable or satellite TV, print or media, etc. Enrolling or subscribing new customers for a service involves getting critical information about the customer, informing the customer regarding terms of a service contract, getting customer consent, receiving payment, etc. Typically, paperwork related to enrollment is completed by filling out standard forms, which are processed and/or validated by the businesses to set up the service or transaction. Often, the enrollment or application forms are filled out by the customers or sales representatives of the businesses. For example, at a bank, opening a new bank account involves completing one or more account opening forms, while a new loan may require completion of one or more loan application forms.

For a customer's convenience, a business representative may go on the road and facilitate filling out the relevant forms at a customer's home or office. For example, banks can capitalize on a business opportunity by sending representatives to the premises of a company to enroll new employees by opening salary accounts. Further, bank branches in rural or semi-urban areas may not be easily accessible to customers; therefore, banks acquire new customers in such areas by sending representatives to customer's home or workplace. In urban areas, a bank representative may set up meetings and meet individual customers by appointment at a convenient location. Each bank representative may meet as many as 20 people per day within his or her assigned area. As a result, there are risks of errors if the representative mistakenly switches documents from different customers.

When they go on the road, bank representatives may carry a kit of forms to the customer's home or workplace to open a new account. In the customer's presence, the representative may fill out parts of the required forms and collect photocopies of required supporting documents, such as proof of identity and proof of address. Later on, the bank representative may use the photocopies of the supporting documents to fill out the application form completely. This process may be prone to errors as the customer is not present to validate and verify the information in the forms. For example, a representative may enter an error in a person's address or birth date.

Further, if the customer does not have photocopies of the supporting documents, the bank representative may have to take the supporting documents to on external photocopying service (such as a nearby photocopy shop) to prepare the application set, which is time-consuming. Thereafter, the filled forms are typically couriered to a branch office or a back-office, for further checking and processing. If any form is missing or inconsistent or inaccurate information is inserted, the bank representative may have to contact the customer again. There is also a great risk that the forms or the supporting documents may get damaged or lost during transit.

In practice, bank representatives often take photocopies of the supporting documents and customer's photographs and signature on an empty form and fill out the application form with the help of supporting documents once he or she is back to the branch office. Although this practice saves the time in the beginning, it may increase time that the representative has to spend verifying information or the customer may have to contact the bank to fix errors in the application. Because the representative is not filling most of the form in the customer's presence, the chance of errors in filling information increases. For example, the bank representative may mistakenly switch the first and last name of the customer or use a prior phone number as the current contact number, etc.

Thus, there is a need to develop portable devices, related systems and methods that are robust, and decrease the time needed to fill out and process forms quickly and accurately with minimal errors.

SUMMARY

In one aspect, the present disclosure provides a system for facilitating filling at least one unfilled form including at least one data field. The system includes a display module configured to display the at least one unfilled form. Further, the system includes a scanning module configured to scan at least one supporting document, a classifier module configured to classify the at least one supporting document into at least one document class, an extracting module configured to extract the information from the at least one supporting document based on the at least one document class and a form filling module configured to fill out the at least one unfilled form to obtain at least one filled form. Finally, the system includes a communication module configured to send the at least one filled form over a communication network.

In another aspect, the present disclosure provides a system for facilitating filling at least one unfilled form. The system comprising a portable electronic communication device and a central server. The portable electronic communication device includes a display module configured to display the at least one unfilled form including at least one data field. Further, portable electronic communication device includes a scanning module configured to scan at least one supporting document, a classifier module configured to classify the at least one supporting document into at least one document class, an extracting module configured to extract the information from the at least one supporting document based on the at least one document class, a questionnaire module configured to provide an adaptive questionnaire to obtain additional information and a form filling module configured to fill out the at least one unfilled form to obtain a filled form. Finally, the portable electronic communication device includes a communication module configured to send the filled form to a central server over a communication network. The central server is configured to transmit the at least one unfilled form to the portable electronic communication device, receive the filled form and process the filled form.

In another aspect, the present disclosure provides a method for filling out at least one unfilled form. The method includes receiving the at least one unfilled form including at least one data field. Then, the at least one unfilled form is displayed. Next, at least one supporting document is scanned and classified into the at least one supporting document class. Thereafter, the information from the at least one supporting document based on the at least one supporting document class is extracted. Next, an adaptive questionnaire is provided to obtain additional information. Then the at least one unfilled form is filled out to obtain a filled form. Finally the filled form is sent and processed.

In yet further aspect, the present disclosure provides a portable electronic communication device. The portable electronic communication device includes a storage module stores at least one unfilled form including at least data field. The portable electronic communication device also includes a display module displays the at least one unfilled form, a scanning module scans at least one supporting document, a classifier module classifies the at least one supporting document, an extracting module extracts the information from the at least one supporting document, a questionnaire module provides an adaptive questionnaire to obtain additional information and a form filling module fills out the at least one unfilled form to obtain at least on filled form. Finally, the portable electronic communication device includes a communication module to send the at least one filled form.

In an aspect, the present disclosure provides a portable electronic communication device. A portable electronic communication device includes a memory and a processor. The memory is configured to store at least one unfilled form. The processor configured to display the at least one unfilled form including at least one data field, scan at least one supporting document, classify the at least one supporting document, extract the information from the at least one supporting document, provide an adaptive questionnaire to obtain additional information, fill the at least one unfilled form and send the filled form.

In a further aspect, the present disclosure provides a central server configured to transmit at least one unfilled form to a portable electronic communication device. Thereafter, the central server receives a filled form from the portable electronic communication device, wherein the portable electronic communication device fills out the unfilled form basis supporting documents. Finally, the central server processes the filled form.

In another aspect, the present disclosure provides a system for facilitating filling at least one unfilled form including at least data field. The system includes a memory to store the at least one unfilled form. The system also includes a processor configured to receive the at least one unfilled form to the portable electronic communication device and display the at least one unfilled form including at least data field. Thereafter, the processor scans at least one supporting document, classifies the at least one supporting document, extracts the information from the at least one supporting document, provides an adaptive questionnaire to obtain additional information and fills out the at least one unfilled form. Finally, the processor sends out the filled out form, which is then received and processed.

BRIEF DESCRIPTION OF THE DRAWINGS

FIG. 7 is an exemplary filled form, according to one aspect of the present disclosure.

DETAILED DESCRIPTION

Figure 1A:
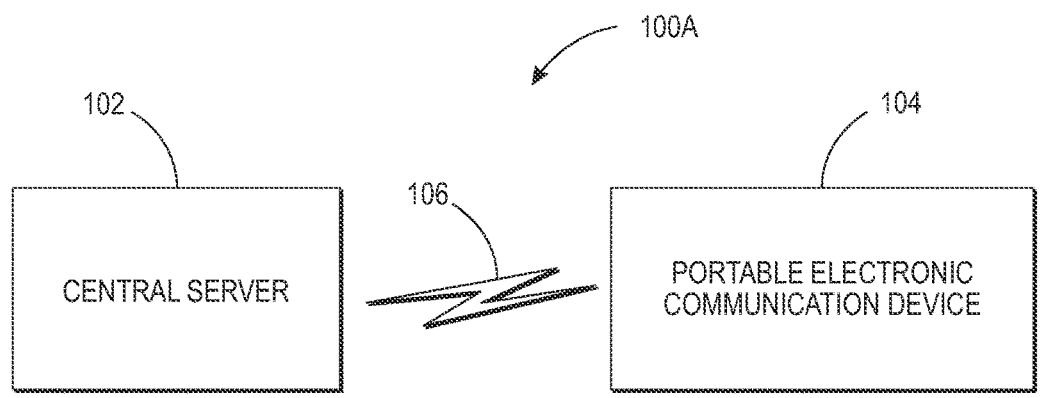
FIG. 1A is a schematic illustration of an exemplary system, according to one aspect of the present disclosure.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

Definitions:

Definitions of one or more terms that will be used in this disclosure are described below.

As used herein, a Multi-Function Device (MFD) the term "MFD" as used herein includes a single device that offers a number of traditionally separate functionalities, such as printing, copying, scanning, and faxing. Further, "mobile device" refers to any device that has a wireless connection with a network or components related to the network. The "mobile device" can also be a landline telephone as long as it can communicate with the MFD remotely. The present disclosure includes mobile users such as cell phones, Smartphones, PDAs, and so on. Moreover, an "address" is any identifying information that allows a device to be accessed on a network, such as an IP address or URL, the URL including both long form (including full protocol information, such as "http://") or short form, beginning with "www" or only a website name, such as "foobar.com". An "access code" is an identifier capable of designating a specific device, such as an MFD, on a computer network or local computer system. A "telephone number" is an identifier capable of identifying a device or location on a telephone network of any type, including traditional voice networks, packet-oriented.

The term "forms" refers to documents that the customers or business representatives fill out to enroll in or modify a service businesses in various industries such as banking, insurance, telecommunication, cable or satellite TV, print or media, etc. For example, the banking industry may have forms relating to opening a new account, changing personal information, or applying for a loan, whereas forms for telecom services may include buying a new connection, etc. These forms usually include one more data fields for the customer or the bank representative to insert the customer's name, age, address, email, phone, or PAN card, etc. In many cases, the forms are contracts that include an additional field where customers need to sign to attest the accuracy of information filled in the data fields and/or to accept the terms of agreement of the respective contract. Further, payments are sometimes required with some forms. For example, for opening a bank account, a customer needs to deposit an initial amount to meet the requirement of maintaining a minimum balance in the bank account. Such forms include additional data fields for capturing the "payment information", wherein the customer may fill in information regarding the mode of the payment (cash, check, bank draft, etc.) and/or payment amount.

The term, "data" refers to information (may be a text, an image, an audio, a video, or a combination thereof) that may be inserted in the data fields in the forms. For example, customer's name, customer's photo, father's name, address, date of birth, phone number, etc. The forms may also specify the format in which the data has to be inserted in the forms. For example, the name may have to be filled in "BLOCK" letters, the date may be acceptable in only "MM-DD-YYYY" format, etc.

The term, "filled form" refers to a form in which all required data fields are filled such that the form may be accepted as complete and ready for processing.

The term, "unfilled form" refers to a form in which at least one required data field is not filled. Therefore, partially filled forms are also referred to as unfilled forms in this disclosure.

As used herein, the term "supporting documents" refers to documents that are required to be submitted along with the filled forms to subscribe to or enroll in a business service. For example, supporting documents may include documents to show proof of identity and proof of address. For some purposes, proof of identity may be a document with a picture of the customer or a machine-readable bar code such as a passport. Supporting documents may also include a sample of the customer's signature such as backside of a customer's credit card.

As used herein, the term "document class" refers to the class or the category of a supporting document, e.g., a passport, a driving license, etc. Machine learning or pattern recognition may be useful for classification of supporting documents. For example, a driver's license in different states within one country or in different countries may have different formats and different data fields. The classifier module may compare a supporting document that was submitted to existing templates by, e.g., comparing the respective locations of data fields and other objects to determine the probability of accuracy for the classification into a document class.

As used herein, the term "business representative" refers to a representative of the business who is interacting with customers.

As used herein, the term "customer" refers to an individual or a representative of an organization that fills up required forms and provides required supporting documents to enroll in, subscribe to, or modify a business service.

As used herein, the term "module" refers to a unit for performing a particular function or operation, which may be implemented by hardware, software, or the combination of hardware and software.

Overview:

The disclosure generally relates to filling out one or more forms using one or more supporting documents outside of the business premises. Conventionally, a customer or a business representative fills the required one or more forms manually. Filling information manually requires a person's effort and time and is prone to human error. To address existing challenges, some of the disclosed embodiments provide methods, devices and systems for filling out the one or more forms using the one or more supporting documents. In some embodiments, an application running on a portable electronic communication device obtains scanned images of the one or more supporting documents, classifies the one or more supporting documents into one or more known document classes and extracts information from the one or more supporting documents based on their classification. Then, the extracted information is used to fill out the one or more forms. The disclosed embodiments simplify the on-screen fill up of any form on the portable electronic communication device in the presence of the customer and/or the business representative.

The disclosed inventions may be used by various businesses that require filling forms for enrolling new customers for selling services or associated products. Some of the businesses include banks (e.g., to open new bank accounts), insurance companies (e.g., to enroll new customers in insurance plans), and other services including health or spa services, cable or internet services and newspaper subscriptions. Further, product companies may use the disclosed invention to fill out warranty forms or competition forms when customers buy products. Moreover, the businesses may use forms to periodically update customer information.

Overall Exemplary Systems and Methods:

FIG. 1A is a schematic illustration of an exemplary system 100A, according to one aspect of the present disclosure. The system 100A includes a central server 102 and a portable electronic communication device 104. The central server 102 may be located in a back-office of the business (business service provider). The central server 102 provides one or more unfilled forms to the portable electronic communication device 104. The one or more unfilled forms include at least one field for inputting information about the customer, such as, for example, name, age, date of birth, permanent address, communication address, PAN card number, etc. The central server 102 may receive filled forms from the portable electronic communication device 104 for further processing. Moreover, the central server 102 may run applications to check for correctness and/or completeness of the filled forms.

In some embodiments, the filled forms need not be sent to the central server 102, but may be processed in the portable electronic communication device 104 itself. The portable electronic communication device 104 may process the forms and send information about the new customer to the appropriate authority within the service company, such as an inbox for new customer enrollment.

Various examples of the portable electronic communication device 104 include, but are not limited to, smart phones, Personal Digital Assistant (PDA), tablets, or the like. Further, an application installed on the portable electronic communication device 104 may be used to fill the one or more forms.

The central server 102 and the portable electronic communication device 104 may communicate with each other through a wireless link 106. Examples of the wireless link 106 include, but are not limited to, 2G, 3G, or a Wi-Fi link. However, other embodiments may use other related art or later developed methods and apparatus to enable communication between the central server 102 and the portable electronic communication device 104.

The portable electronic communication device 104 is configured to scan and extract information from one or more supporting documents. Examples of the supporting documents include, but are not limited to, a personal account number (PAN) document, a social security number (SSN) document, a birth certificate, a driving license, and so forth. The portable electronic communication device 104 then may fill a form associated with the business based on the extracted information. The portable electronic communication device 104 includes a number of modules as explained in detail with reference to FIG. 2.

Figure 1B:
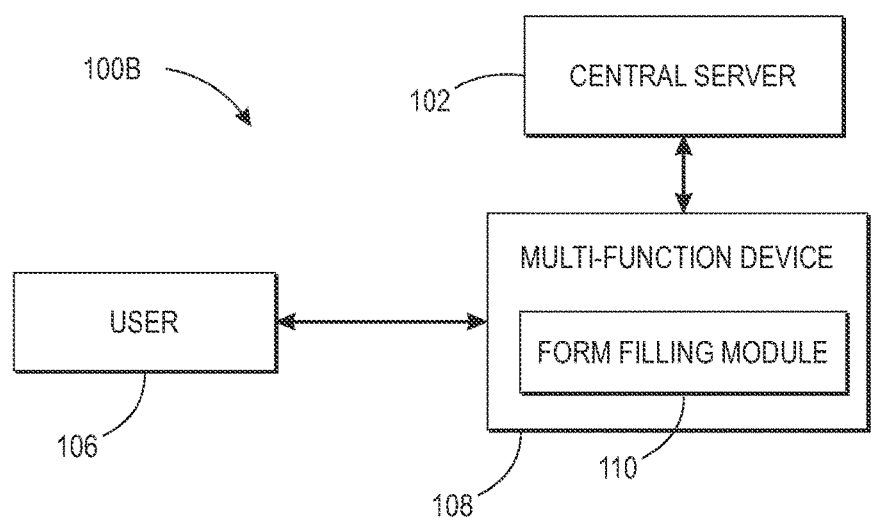
FIG. 1B illustrates an exemplary system, in accordance with another embodiment of the present disclosure.

FIG. 1B illustrates a system 100B, in accordance with another embodiment of the present disclosure. The system 100B includes a user 106 and a multi-function device 108. The user 106 may be a customer or bank representative. The multi-function device (MFD) 108 includes a form-filling module 110 for automatically filling an application form associated with a business service. The form filling module 110 is functionally similar to a form filling module 212 explained with reference to subsequent figures.

In the system 100B, the form filling module 110 is an integrated system within the MFD 108. The MFD 108 is a device that performs printing, scanning, copying, or other known imaging functions. It will be understood that the MFD 108 may perform one, few, or all of the mentioned operations without departing from the scope of the present disclosure. For example, the MFD 108 may be a standalone printer or facsimile machine. Alternatively, the MFD 108 may be a three-in-one printer, scanner, and copier. Further, the MFD 108 may include a suitable interface allowing it to connect with the network and the mobile devices. These interfaces include network interface, cellular interface, or parallel to serial interface. In the illustrated embodiment, the MFD 108 includes a network interface facilitating network connectivity. The users can fill a form and submit at the MFD 108 using one or more interfaces of the MFD 108.

The form filling module 110 can scan supporting documents and extract one or more information from the supporting documents. The supporting documents can be a Personal Identification Number (PAN), a driving license, a Social Security Number (SSN), a passport, and so forth. The form-filling module 110 then can fill one or more form based on the extracted information from the supporting documents. The filled form then may be forwarded to the central server 102 for further processing. The structural components of the MFD 108 are described in detail in FIG. 1C.

Figure 1C:
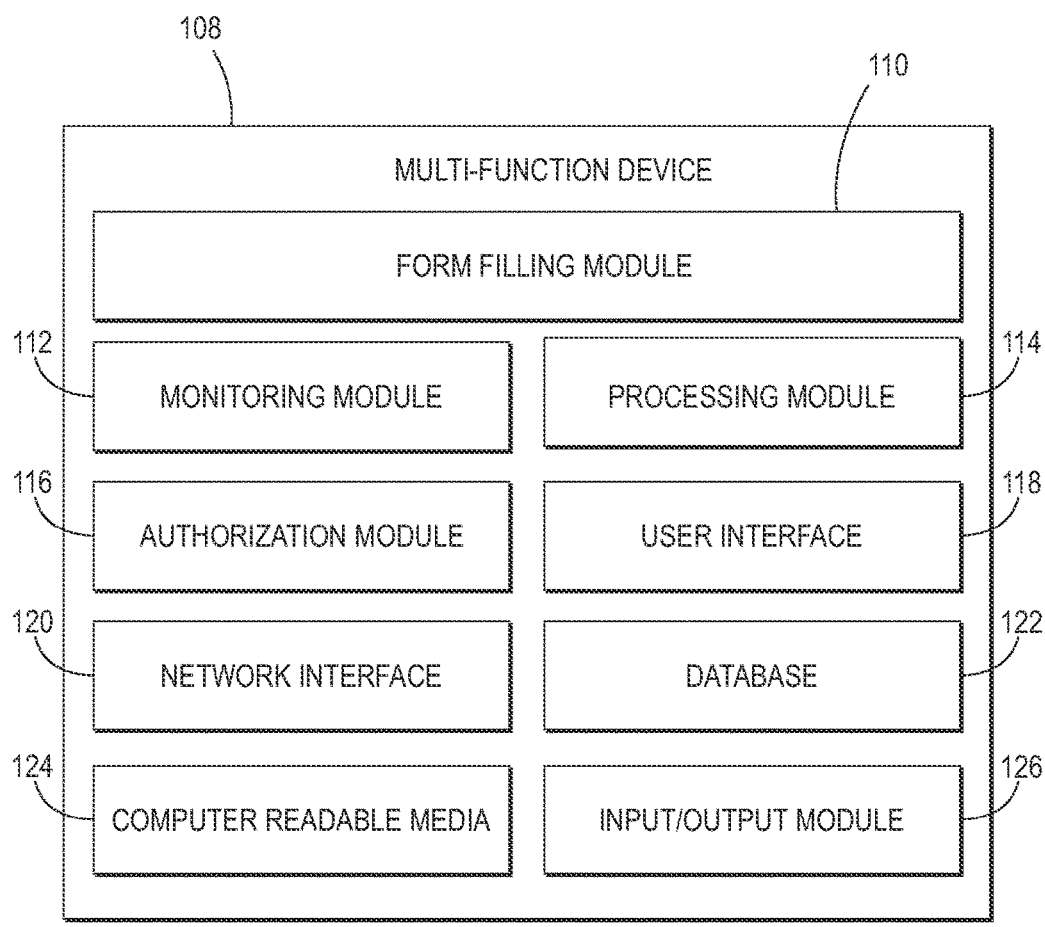
FIG. 1C illustrates structural components of an exemplary Multi-Function Device (MFD) of FIG. 1B.

FIG. 1C illustrates structural components of the exemplary Multi-Function Device (MFD) 108 of FIG. 1B. As discussed with reference to FIG. 1B, the user 106 can interact with the form-filling module 110 directly or indirectly through the MFD 108, which in turn may connect to a central server 102, for accessing one or more services. The MFD 108 incorporates into a single device a number of traditionally separate functionalities, such as printing, copying, scanning, and faxing. To make these functionalities available to multiple users, the MFD 108 is often incorporated in a computing network, allowing users to communicate directly with the MFD 108. As shown, the form filling module 110 is configured within the MFD 108.

To be able to perform above mentioned functions, the MFD 108 includes a monitoring module 112, a processing module 114, an authorization module 116, a user interface 118, a network interface 120, a database 122, a computer readable media 124, and an input/output module 126. The network interface 120 allows the MFD 108 to receive and send information to the central server 102. The input/output (IO) module 126 may take information or may output information to the user 106. The user 106 may submit the first form at the MFD 108 using the IO module 126. In addition, the IO module 126 may include a printer for printing the forms. In some instances, the monitoring module 112 may monitor multiple MFD parameters, such as usage, toner availability, performance, paper jam based on requests received from the user 106 or the central server 102.

The processing module 114 may receive information from the monitoring module 112 and provide processed information to the user interface 118, the network interface 120 and to the database 122. To this end, the processing module 114 converts the received information into user readable format (in case the information is provided to a user) and database or module readable format (in case information is received from a user). The user 106 may also interact with the MFD 108 through the user interface 118. The user interface 118 can be a graphical user interface (GUI).

In case the processing module 114 receives data such as a support document, filled form from the user 106 or the central server 102, it may process that information and act upon it, as required. For example, if the received information is a print command, then, the processing module 114 retrieves the data to be printed and automatically give a print command to the MFD 108.

The authorization module 116 regulates access to the MFD 108 based on predetermined user IDs, access codes or preconfigured telephone numbers. For example, each cell phone number of the user 106, or the user 106 may have an associated access code, or unique identity (ID) known only to the user 106. So, along with the print command, users may also be prompted to enter an access code or ID for authenticating the user 106 prior to providing access to the MFD 108. For these functions, the database 122 stores profiles of users that includes user information, access codes, telephone numbers, unique IDs, names, preferred printing configurations, preferred paper quality, etc.

The user interface 118 includes multiple modes of communication, for example, it may be a simple display, an interactive touch screen display, an audio system, a combination of a display and audio system. In addition, the user interface 118 may include and provide one or more options to the user 106, for example, for selecting a type of service or form, for submitting form, printing, and so forth. The form includes one or more fillable fields.

The form filling module 110 can scan one or more supporting documents required for filling a form. In an embodiment, the MFD 108 may scan the one or more supporting documents. Thereafter, the form filling module 110 processes the scanned supporting document to extract the content. The content may be extracted from the supporting documents by using any of the existing conventional methods such as, but are not limited to, a match-lifting algorithm.

The database 122 may store one or more templates, format of supporting document, type of supporting documents, un-filled forms, and so forth. The extracted content is then overlaid or embedded onto an un-filled form, and having fillable fields corresponding to the content of the supporting documents using the form filling module 110. In some embodiments, the form-filling module 110 may itself include many modules for scanning, extracting, etc. The form filling module 110 includes a transceiver (not shown) configured to send a number of forms such as the filled out form(s) to a central server 102.

Figure 2:
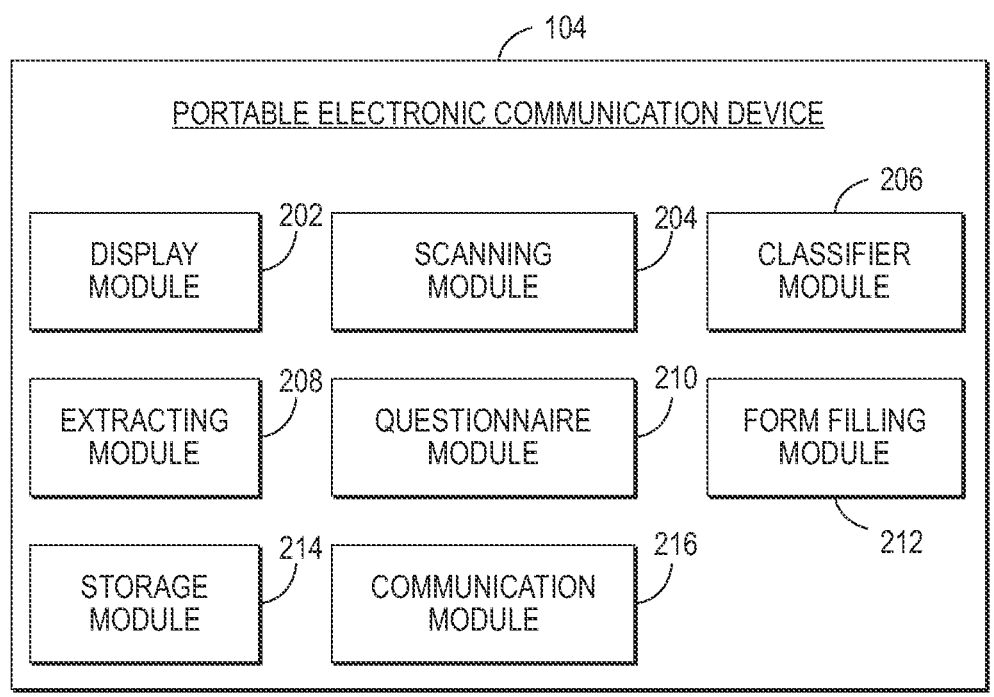
FIG. 2 is a schematic illustration of a portable electronic communication device, according to one aspect of the present disclosure.

FIG. 2 is a schematic illustration of a portable electronic communication device 104, according to one aspect of the present disclosure. The portable electronic communication device 104 includes a display module 202, a scanning module 204, a classifier module 206, an extracting module 208, a questionnaire module 210, a form-filling module 212, a storage module 214, and a communication module 216. Further, the portable electronic communication device 104 may include a processor (not shown) to execute the modules 202-216. In some embodiments, each of the modules 202-216 may be implemented using separate applications installed on the portable electronic communication device 104, wherein the customer and/or the bank representative initiates the applications on the portable electronic communication device 104 in any order as per the requirements.

In some embodiments, the communication module 216 may receive one or more unfilled forms from the central server 102. The communication module 216 may use the wireless link 106 to communicate with the central server 102. The storage module 214 may store digital information including the one or more unfilled forms, images of one or more supporting documents for future use, extracted information from the supporting documents, filled forms, machine-learning algorithms, templates or training modules, etc. The storage module 214 may include devices such as RAM, ROM, hard disk drives, floppy disk drives, optical drives (such as CD-ROM, CD-R, CD-RW, DVD-RAM, or DVD-ROM drives), or tape drives.

Thereafter, the display module 202 may display the one or more unfilled forms received from the central server 102. Further, the display module 202 may be used in connection to user interfaces that enable the customer and/or the bank representative to fill-in and/or modify the information filled in the forms using an input device such as a keyboard/keypad, a mouse, a trackball, a touchpad, a track pad, a joystick, a pointing stick, a stylus, a light pen, a light gun, a cyber glove, or a touch screen.

The scanning module 204 may scan one or more supporting documents provided by a customer. The scanning module 204 may include devices such as an in-built camera of the portable electronic communication device 104, an external camera or a portable scanner. The classifier module 206 may classify the scanned one or more supporting documents into one or more known document classes. The classifier module 206 is explained in further detail in conjunction with FIG. 5 below. The extracting module 208 may extract information from the one or more supporting documents based on their classification. The extracting module 208 is explained in further detail in conjunction with FIG. 6 below. The questionnaire module 210 may provide an adaptive questionnaire to obtain additional information. The form-filling module 212 may fill out the one or more unfilled forms using the extracted information. The form-filling module 212 is explained in further detail in conjunction with FIG. 7 below. The communication module 216 may further send the filled forms to the central server 102 over the wireless link 106.

In some embodiments, the central server 102 includes the classifier module 206, the extracting module 208, the questionnaire module 210 and the form-filling module 212. The communication module 216 of the portable electronic communication device 104 sends the scanned copies of the one or more supporting documents to the central server 102. The classifier module 206 may then classify the one or more supporting documents into one or more document classes, the extracting module 208 may extract information from the one or more supporting documents based on their classification, questionnaire module 210 may provide an adaptive questionnaire to obtain additional information, and the form-filling module 212 may fill out the one or more unfilled forms using the extracted information and the additional information obtained using the adaptive questionnaire to obtain one or more filled forms. Thereafter, the central server 102 may send the one or more filled forms to the communication module 216 and the display module 202 may display the received one or more filled forms on the portable electronic communication device 104. The customer and/or the bank representative may then view the information filled out in the one or more filled forms. Further, the display module 202 may provide user interface such as, e.g., a touchscreen for the customer and/or the bank representative to modify the information filled out in the one or more filled forms. Finally, the communication module 216 sends the updated one or more filled forms to the central server 102 for further processing.

In other embodiments, the scanning module 204 may include the classifier module 206 and the extracting module 208. The scanning module 204 may be a software application provided by a third party software application developer. The scanning module 204 may use optical character recognition (OCR) technology to classify the one or more supporting documents into one or more document classes and to extract information from the one or more supporting documents based on their classification. The scanning module 204 may be provided by the manufacturer of the scanning device used to scan the one or more supporting documents. Many scanner manufacturing companies operating in the market provide OCR software along with the scanner.

Figure 3:
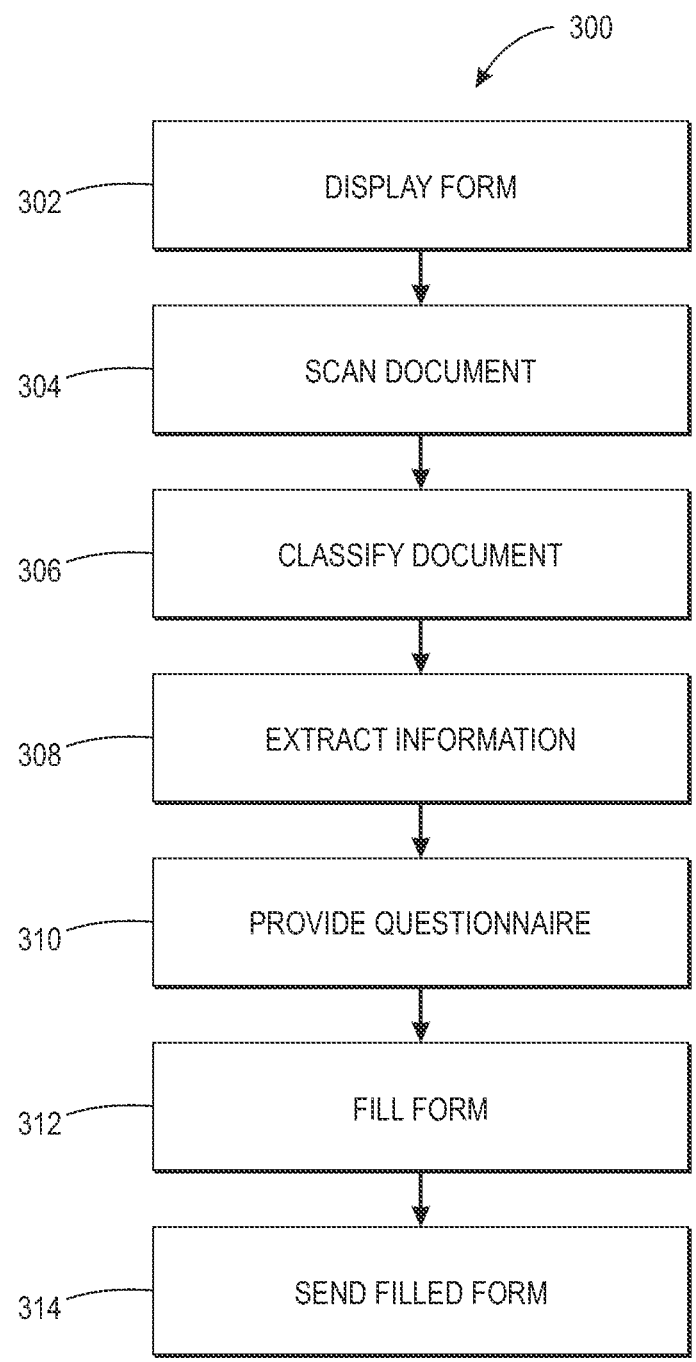
FIG. 3 is a flowchart illustrating a method for facilitating filling an unfilled form, according to one aspect of the present disclosure.

FIG. 3 is a flowchart illustrating a method 300 for a filling an application form, according to one aspect of the present disclosure. In some embodiments, a form-filling software application installed on the portable electronic communication device 104 may be initiated on the portable electronic communication device 104, but in some instances, the form-filling software application may be initiated by the customer and/or business representative.

At step 302, the display module 202 displays the one or more forms. The communication module 216 may receive the one or more forms from the central server 102. Alternatively, the display module 202 may retrieve the one or more forms stored in the storage module 214. Then, the scanning module 204 may scan one or more supporting documents using an in-built camera in the portable electronic communication device 104 at step 304. The customer may provide the supporting documents. Alternatively, a customer or representative may pre-scan the one or more supporting documents and store the scanned copies in the storage module 214 for future use, and the portable electronic communication device 104 may retrieve the one or more supporting documents from the storage module 214.

Then at step 306, the classifier module 206 classifies the one or more supporting documents into the one or more document classes. The classifier module 206 may be trained on a set of training data that includes the various supporting documents accepted by the respective business service. The classifier module 206 may be trained using various machine learning or pattern recognition techniques known in the art. For each supporting document, the classifier module 206 classifies each supporting document into one or more document classes (such as passport, driving license, etc.) with some probability of accuracy. The classifier module 206 may assign a document class with the highest probability of accuracy as the detected document class of the respective document. The probability of accuracy for a document class may be determined based on number of features of the supporting document that match with the features of one or more templates of the document class.

Further, the classifier module 206 may provide a user interface to show the detected document class to a customer and/or the bank representative, and also enable the customer and/or the bank representative to modify the detected document type in case of an incorrect detection. This feedback from the customer and/or the bank representative may also be used to further train the classifier module 206 to minimize such incorrect detection in future. This is explained in further detail in conjunction with FIG. 5 below.

Thereafter, at step 308, the extracting module 208 extracts the required information from the one or more supporting documents based on the detected document class of each of the one or more supporting documents. The extracted information includes, but are not limited to, name, date of birth, address, contact number, email address, PAN card, or other information. Further, the extraction module 208 may use a template of the detected document class to extract the information corresponding to the known data fields in the template. For example, if the detected document class is a passport, then the extracting module 208 extracts name of the passport owner, date of birth, passport number, etc. The extracting module 208 extracts the typed information available on the one or more supporting documents using OCR technology known in the art. For the handwritten information in the one or more supporting documents, the extraction module 208 may use handwriting recognition technology known in the art. This has been explained in further detail in conjunction with FIG. 6 below.

Then, at step 310, the questionnaire module 210 provides an adaptive questionnaire to obtain additional information. The adaptive questionnaire includes a set of questions selected based on the information obtained the at least one supporting document by the extraction module 208. For example, the questionnaire module 210 may select questions to obtain required information not obtained from the at least one supporting document. Further, each question in the set of questions may be one of a multiple-choice question, a short answer, an essay question and a true/false question.

Moreover, the questionnaire module 210 presents a user interface enabling the user to provide the additional information for the presented set of questions. The questionnaire module 210 provides the set of questions to the user one-by-one in an adaptive manner, such that the next question provided to the user depends on the additional information obtained for the previous questions presented to the user. For example, the questionnaire module 210 may provide a multiple-choice question that requires the user to select one of the options—self-employed, salaried, and skilled professional. If the user selects the option 'salaried', then the next question provided to the user may be a short answer question that requires the user to provide the name of the employer.

Further, the questionnaire module 210 is further configured to process the information extracted from the at least one supporting document to obtain supplementary information required to fill the at least one unfilled form. For example, if the extracted information includes the date of birth of a user, the questionnaire module 210 may use the date of birth to determine if the user is a minor or a senior.

Then, at step 312, the form-filling module 212 fills the data fields of the one or more forms using extracted information and the additional information obtained using the adaptive questionnaire. The supplementary information obtained by processing the extracted information may also be used to fill the one or more forms. The form-filling module 212 may also validate the information filled in the data fields of the one or more forms to identify errors. For example, a form may require the date of birth to be filled in "MM-DD-YYYY" format. However, if the date filled in this data field does not comply with the format (Ex. 15-11-1980), then the form-filling module 212 may highlight the error during validation and request the customer and/or the bank representative to modify the date. Further, before sending the one or more filled forms the form-filling module 212 may show the one or more filled forms to the customer and/or the bank representative for manual verification. The form-filling module 212 may also provide an interactive user interface to allow the customer and/or the bank representative to manually modify and/or fill-up information in the respective fields. Finally, the communication module 216 sends the filled form to the central server 102 at step 314.

In some embodiments, the forms may be filled out and processed within a short time frame from about one day to about a week. For example, a new bank account may be opened within 24 hours after the forms are filled out.

The filled forms received at the central server 102 may be processed. Processing the forms may include automatic/manual validation and verification of number of forms and the data filled out in the forms. The filled forms may be returned to the portable electronic communication device 104 if any discrepancy is found. However, if the filled forms are accepted, the necessary next step may be taken. For example, if the filled forms relate to opening a bank account, then once the filled forms are accepted, the corresponding bank account is opened in the banking system.

Figure 4:
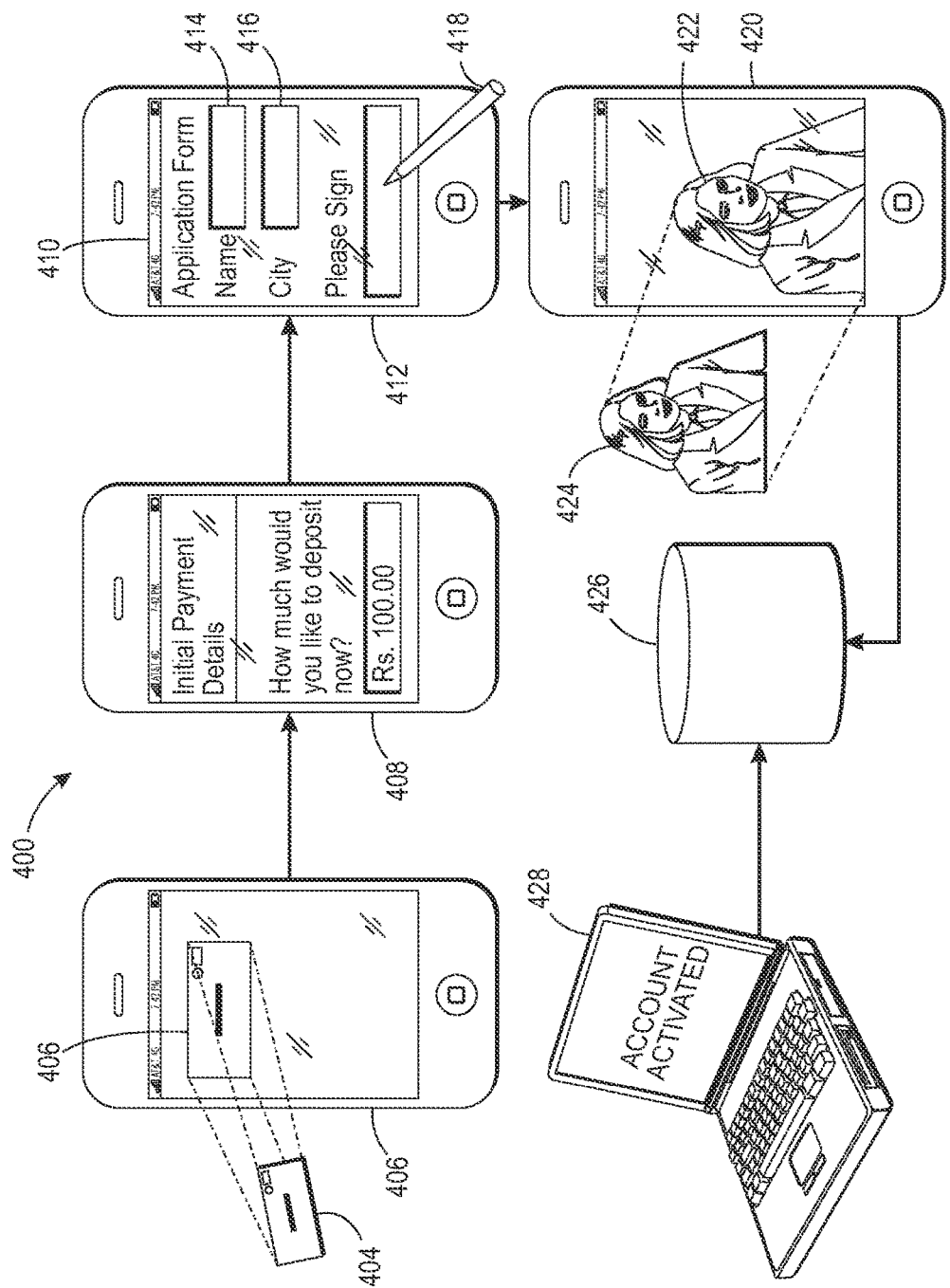
FIG. 4 is a flow diagram illustrating a method for facilitating filling an application form to open a bank account, according to one aspect of the present disclosure.

FIG. 4 is a flow diagram illustrating a method 400 for filling up an application form to open a bank account, according to some embodiments of the disclosure. A bank representative carrying the portable electronic communication device 104 may visit a customer. The customer may provide physical copies of one or more required supporting documents 404. At step 402, the bank representative scans the one or more supporting documents 404 using the portable electronic communication device 104, to obtain corresponding one or more scanned copies 406. Then, the classifier module 206 may classify the one or more supporting documents into one or more document classes and the extracting module 208 may extract the required information based on templates of the detected document classes. At step 408, the questionnaire module 210 prompts the customer and/or business representative to fill out the additional information not available with the supporting documents (such as initial payment details, nomination, etc.). Once the additional information is provided, the completely filled up application form or its image 410 may be displayed on the portable electronic communication device 104 at step 412. As shown, the form includes a "name" field 414 and a "city" field 416. The customer may be prompted to sign the completely filled form. The customer may sign the filled form using a stylus 418 on the touch screen of the portable electronic communication device 104. Further, customer may sign the completely filled form using a digital signature. Then, at step 420, the business representative may take a photo 422 of a customer 424 using the portable electronic communication device 104. Finally, the communication module 216 may send the entire application form 410 including the one or more scanned copies 406 of the supporting documents and the photo 422 of the customer 424 to the back office via secured network at step 426. Once the supporting documents are validated at the back office, the bank account may be activated immediately at step 428.

Figure 5:
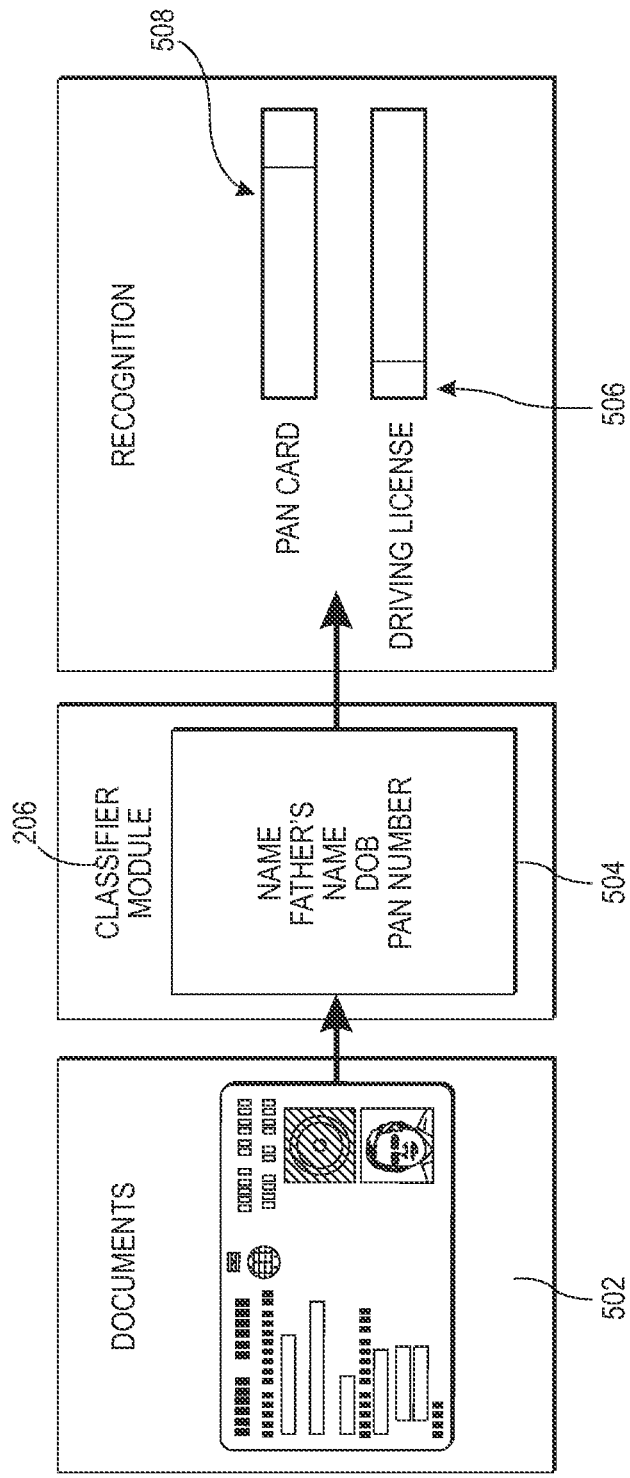
FIG. 5 is a block diagram illustrating operation of a classifier module, according to one aspect of the present disclosure.

FIG. 5 is a block diagram illustrating operation of the classifier module 206, according to one aspect of the present disclosure. The customer and/or the business representative scans (or takes a photo of) a supporting document 502 using the portable electronic communication device 104. Then the classifier module 206 classifies the supporting document 502 into one or more document classes with varying levels of probability of accuracy. The classifier module 206 analyzes patterns and/or the content 504 in the one or more supporting documents to detect the one or more document classes along with the probability of accuracy for each of the detected one or more document classes. The classifier module 206 may be trained on a set of training data, which includes images of sample supporting documents accepted by a respective business service.

For example, the classifier module 206 may classify a supporting document as a driver's license with a probability of accuracy of 0.1 (a probability 506) and as a PAN card with a probability of accuracy of 0.9 (a probability 508). In a further embodiment, the customer may be presented with the one or more detected document classes along with the determined probabilities. As described above, the classifier module 206 may also provide a user interface to show the detected document class to a customer and/or the bank representative along with the determined probabilities, and also enable the customer and/or the bank representative to modify the detected document type in case of an incorrect detection. This feedback from the customer and/or the bank representative may also be used to further train the classifier module 206 to minimize incorrect detection in future.

Figure 6:
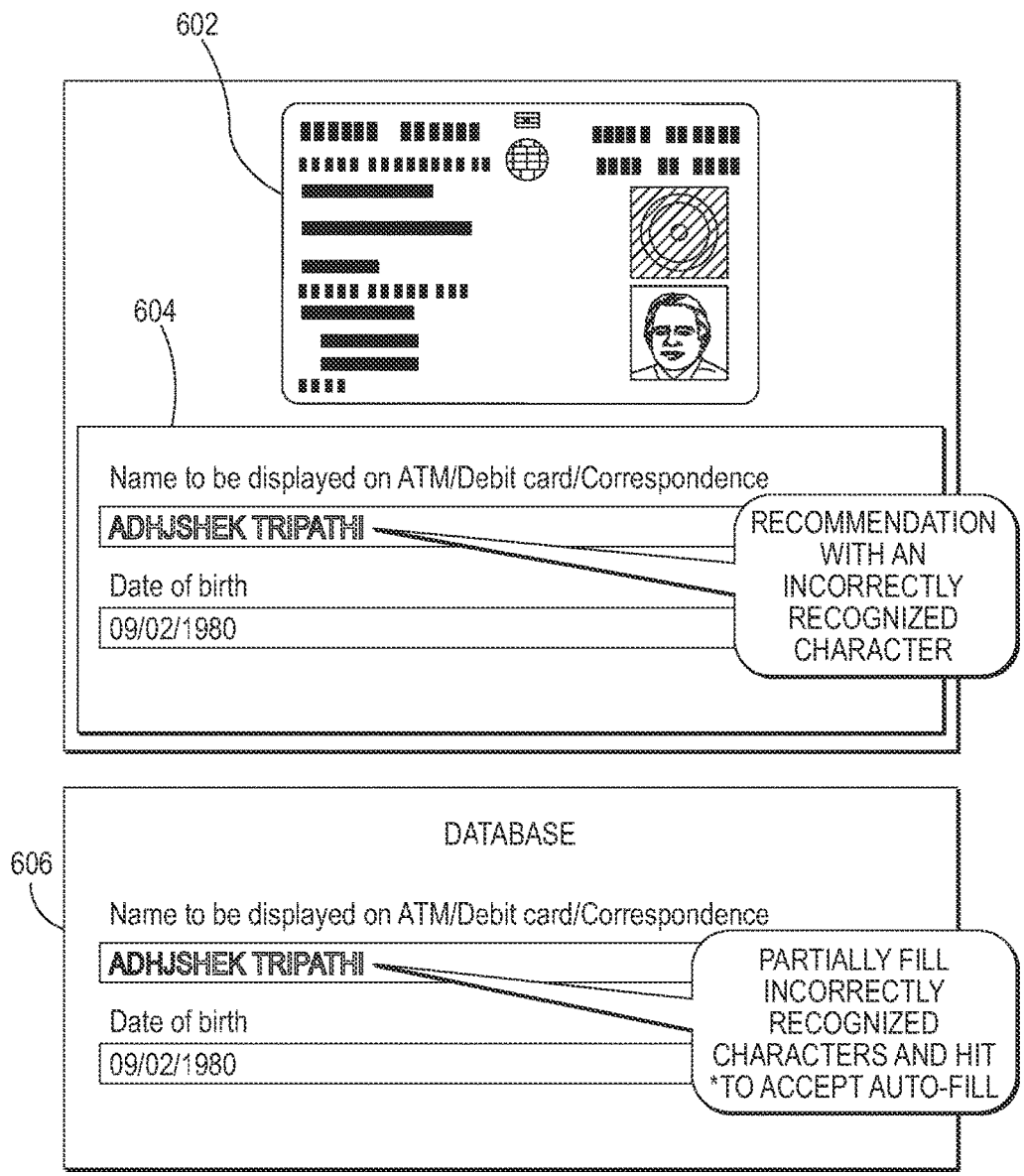
FIG. 6 is a block diagram illustrating information extracted from an image of a supporting document, according to one aspect of the present disclosure.

FIG. 6 is a block diagram illustrating information extracted from an image of a supporting document, according to one aspect of the present disclosure. Once the information is extracted and filled out in the form, the display module 202 shows the filled out information to the customer and/or the business representative. Upon detecting an error, the customer and/or the business representative may correct the error using an interactive user interface provided by the display module 202. For example (as shown in FIG. 6), while detecting a PAN card 602, the extracting module 208 extracts the name of the customer and the form-filling module 212 fills up the extracted name "ABHJSHEK TRIPATHI" (as shown in a field 604) instead of the correct name "ABHISHEK TRIPATHI." Therefore, the customer and/or the business representative may correct the information by typing in the correct information. When the customer and/or the business representative starts typing in the correct name, based on partially filled information, the form-filling module 212 may provide autocomplete suggestions (as shown in a field 606) to the customer and/or the business representative. The autocomplete suggestions may be obtained from a database.

Figure 7:
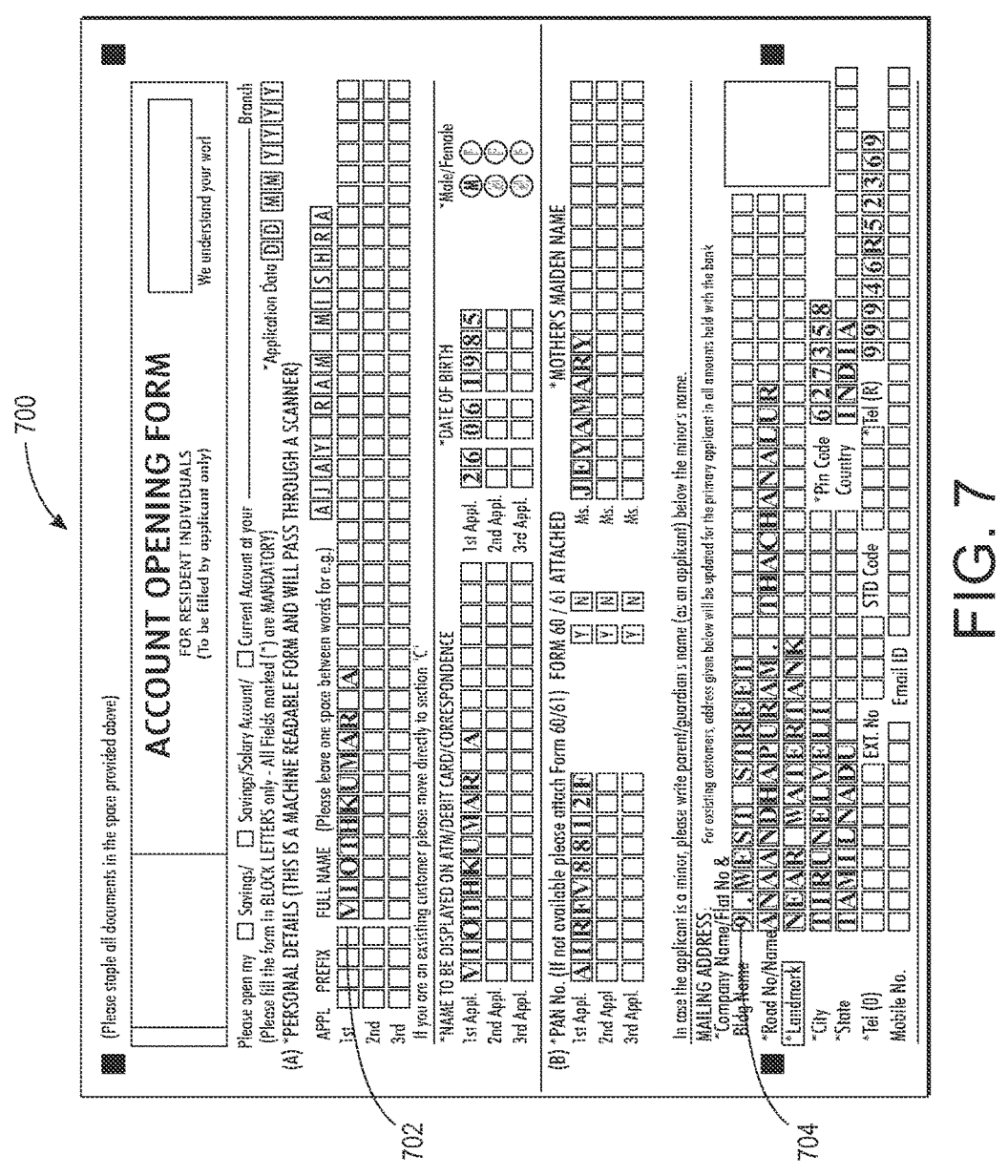

FIG. 7 is a filled form 700, according to some embodiments of the disclosure. The filled form 700 may be an application form to open a new account in a bank. The form-filling module 212 fills out the extracted information appropriately in the relevant fields on the filled form 700. For example, the extracted name is filled in the field 702 and the extracted address is filled in the field 704.

The present disclosure discloses devices, method and systems for filling forms using supporting documents. In some embodiments, the present disclosure provides methods and systems that eliminate the need to verify the application form multiple times as it performs the "Know Your Customer" related tasks in real time when the customer is present. The customer can verify the information and correct any errors located before the forms are submitted to the back-office for further processing. This reduces the chances of detecting errors later; thereby, saving considerable resources of both the service provider and the customer. Further, the disclosed methods and systems eliminate the cost of courier services for paper forms, as the application sets may be stored and submitted digitally. The supporting documents may be printed using mobile-print solutions. Yet further, the disclosed methods and systems allow the business representative to travel "light" as they do not need to carry form kits while visiting customers. Moreover, the disclosed methods and systems allow clubbing multiple processes together and ease the business' workload as they may be completed in real time at the customer site in the presence of the customer. Finally, the disclosed methods and systems provide means to reduce errors and make the process of form processing faster. The filled forms may be shared right away, for example over 3G or Wi-Fi, with the back office/branch office to process the forms.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A computer implemented method for filling out a form required to be filled out by a customer or business representative to enroll in, subscribe to, or modify a business service associated with a business serviced provider, the system comprising:

a processor of a portable electronic communication device executing machine readable program instructions for performing:
 receiving, from a server, an unfilled form having at least one data field required to be filled in by a user to enroll in, subscribe to, or modify a business service associated with a business service provider;
 retrieving at least one scanned supporting document;
 retrieving templates stored on a storage device of the portable electronic communication device and comparing respective locations of data fields and objects in the supporting document to each template to determine a probability of accuracy for classifying the supporting document into a detected document class;
 extracting information from the supporting document using the template associated with the detected document class;
 filling in data fields of the unfilled form using the extracted information; and
 in response to at least one data field in the form remaining unfilled, communicating, to the display device, an adaptive questionnaire comprising a set of questions presented to the user to obtain additional information until there are no more questions in the set of questions to communicate by:
  a. receiving an input from the user using an input device of the portable electronic communication device, the user providing additional information in response to the adaptive questionnaire;
  b. filling in the data fields of the unfilled form using the additional information provided by the user to obtain a filled form; and
  c. depending on the input received, presenting a next question in the set of questions to the user;
   in response to more questions in the set of questions remaining repeating steps a through c, otherwise transmitting the filled form to the server.

2. The computer implemented method of claim 1, wherein the user's portable electronic communication device is any of: a smartphone, a Personal Digital Assistant (PDA), and a tablet-PC.

3. The computer implemented method of claim 1, wherein the supporting document is classified by comparing respective locations of data fields and other objects to determine a probability of accuracy for the classification into a document class.

4. The computer implemented method of claim 1, wherein the server is further configured to run an application to check for correctness and completeness of the filled forms.

5. The computer implemented method of claim 1, wherein the user is a new customer, further comprising the processor executing machine readable program instructions for sending information about the new customer to an appropriate authority within the service company.

6. A system for filling out a form required to be filled out by a customer or business representative to enroll in, subscribe to, or modify a business service associated with a business serviced provider, the system comprising:
   a server containing unfilled forms having at least one data field which are required to be filled in by a user to enroll in, subscribe to, or modify a business service associated with a business service provider; and
   a portable electronic communication device in wireless communication with the server, comprising:
      a memory;
      a storage device;
      a display device;
      an input device for effectuating a user input; and
      a processor executing machine readable program instructions for:
         receiving an unfilled form from the server;
         retrieving at least one scanned supporting document;
         retrieving templates stored on the storage device and comparing respective locations of data fields and objects in the supporting document to each template to determine a probability of accuracy for classifying the supporting document into a detected document class;
         extracting information from the supporting document using the template associated with the detected document class;
         filling in data fields of the unfilled form using the extracted information; and
         in response to at least one data field in the form remaining unfilled, communicating, to the display device, an adaptive questionnaire comprising a set of questions presented to the user to obtain additional information until there are no more questions in the set of questions to communicate by:
            a. receiving an input from the user using an input device of the portable electronic communication device, the user providing additional information in response to the adaptive questionnaire;
            b. filling in the data fields of the unfilled form using the additional information provided by the user to obtain a filled form; and
            c. depending on the input received, presenting a next question in the set of questions to the user;
               in response to more questions in the set of questions remaining repeating steps a through c, otherwise transmitting the filled form to the server.

7. The system of claim 6, wherein the user's portable electronic communication device is any of: a smartphone, a Personal Digital Assistant (PDA), and a tablet-PC.

8. The system of claim 6, wherein the supporting document is classified by comparing respective locations of data fields and other objects to determine a probability of accuracy for the classification into a document class.

9. The system of claim 6, wherein the server is further configured to run an application to check for correctness and completeness of the filled forms.

10. The system of claim 6, wherein the user is a new customer, further comprising the processor executing machine readable program instructions for sending information about the new customer to an appropriate authority within the service company.

* * * * *